United States Patent [19]

Paetsch

[11] 4,286,224

[45] Aug. 25, 1981

[54] FM DATA DEMODULATOR INCLUDING CIRCUIT FOR ELIMINATING STEP DISTORTION

[75] Inventor: Werner Paetsch, Munich, Fed. Rep. of Germany

[73] Assignee: Siemens Aktiengesellschaft, Berlin & Munich, Fed. Rep. of Germany

[21] Appl. No.: 102,669

[22] Filed: Dec. 12, 1979

[30] Foreign Application Priority Data

Dec. 19, 1978 [DE] Fed. Rep. of Germany ....... 2854833

[51] Int. Cl.³ .................... H03D 3/00; H03K 9/06; H04L 27/14
[52] U.S. Cl. .................. 329/107; 329/132; 329/133; 375/88
[58] Field of Search ............... 329/104, 107, 110, 126, 329/131, 132, 133; 375/80, 82, 88, 90

[56] References Cited

U.S. PATENT DOCUMENTS 3,688,205  8/1972  Burger .......................... 329/104 X
3,851,263  11/1974  Fukushima et al. ................ 329/110

*Primary Examiner*—Siegfried H. Grimm
*Attorney, Agent, or Firm*—Hill, Van Santen, Steadman, Chiara & Simpson

[57] ABSTRACT

A circuit arrangement is disclosed for the correction of step distortions in a transmission of data employing frequency-modulated data signals. The circuit arrangement contains a demodulator which compares time durations between edges of the frequency-modulated data signals with a measuring time duration generated in a timing element and generates demodulated data signals after an integration. The demodulated data signals are compared in a comparator to reference signals and the signals at the output of the comparator are integrated in an integration element. The integration element emits control signals to the timing element. With these control signals the measuring time duration is changed in such manner that the step distortions of the demodulated data signals are opposed.

6 Claims, 4 Drawing Figures

FM DATA DEMODULATOR INCLUDING CIRCUIT FOR ELIMINATING STEP DISTORTION

BACKGROUND OF THE INVENTION

The invention relates to a circuit arrangement for the correction of step distortions in a data transmission employing frequency-modulated data signals. A demodulator is provided which compares the time durations between edges of the frequency-modulated data signals with a measuring time duration generated by means of a timing element and generates demodulated data signals after filtering, these demodulated data signals exhibiting step distortions as a result of frequency deviations of the frequency-modulated data signals.

A demodulator for a demodulation of frequency-modulated data signals is known from the German AS No. 2,606,515, incorporated herein by reference, said demodulator generating signals which are proportional to the difference between the time duration between two respective edges or zero passages of the frequency-modulated data signals and a constant measuring time duration. These signals are integrated upon employment of a low pass filter, and converted into binary demodulated data signals by means of a threshold value stage. The binary values of these demodulated data signals are allocated to the characteristic frequencies of the frequency-modulated data signals.

For generating the measuring time duration, the known circuit arrangement contains a timing element which is designed as a counter which is counted forward by means of clock pulses with a constant repetition frequency. At edges or zero passages of the frequency-modulated data signals, the counter is respectively reset to an initial value. At the same time, a flip-flop is reset. Subsequently, the counter is counted forward by means of the clock pulses up to a predetermined counter reading which, together with the initial counter reading and the repetition frequency of the clock pulses, determines the measuring time duration. When the counter has achieved this predetermined counter reading, the flip-flop is set and it remains set until it is reset by the next edge or by a corresponding zero passage of the frequency-modulated data signals. In case the counter is simultaneously blocked with the setting of the flip-flop, then the duration of the signal setting the flip-flop directly indicates the difference of the time duration between the edges or the zero passages of the frequency-modulated data signals and the measuring time duration. This signal is filtered by employment of a low pass filter. The momentary values of the signals at the output of the low pass filter are allocated to the repetition frequencies of the corresponding frequency-modulated data signals at the input of the demodulator. A threshold value stage is connected thereafter to the low pass filter. This threshold value stage generates binary demodulated data signals whose binary values are allocated to the characteristic frequencies of the frequency-modulated data signals.

In case the frequency-modulated data signals are affected by frequency deviations, the demodulated data signals exhibit step distortions which occur in that a DC corresponding to the frequency deviation is superimposed on the signals at the input of the threshold value stage.

In order to eliminate these step distortions, it is already known from U.S. Pat. No. 3,688,205, incorporated herein by reference, to compensate the superimposed DC at the output of the low pass filter. However, this circuit requires a relatively large expense since it employs switching elements of analog circuit technology. It also depends on temperature and voltage fluctuations and, moreover, cannot be employed given intermittent operation.

SUMMARY OF THE INVENTION

An object of the invention is to provide a circuit arrangement for the correction of step distortions, said circuit arrangement being largely independent of ambient conditions and requiring little expense.

According to the invention, a comparator is provided which compares the momentary values of the demodulated data signals with the momentary values of reference signals whose repetition frequency is equal to double the step frequency of the demodulated data signals. An integration unit integrates the output signal of the comparator and emits control signals to the demodulator which oppose the step distortions of the demodulated data signals due to changes of the measuring time duration.

The circuit arrangement has the advantage that it can be inexpensively manufactured because of its simplicity and can be constructed as an integrated semiconductor module. It already operates with great precision and great reliability even given small frequency deviations of the frequency-modulated signals. The number of transmission errors given frequency deviations is significantly reduced by employing the circuit arrangement. Moreover, it is also suitable for employment given an intermittent transmission of data.

In case the demodulator generates the measuring time duration in a digital manner and a counter is provided as the timing element for this purpose (this counter being counted forward by means of clock pulses with a constant repetition rate and whose counting range determines the measuring time duration), the measuring time duration is altered in a particularly advantageous manner since the control signals emitted by the integration unit are supplied to the counter and change its counting range.

Given a constant highest counter reading of the first counter stage, it is particularly favorable when the control signals alter the initial counter reading of the counter in the timing element.

An advantageous development of the circuit arrangement is achieved in that the integration element contains a first counting stage which is counted forward or backward as a function of the output signal of the comparator during fixed time durations, and further contains a second counting stage which is always counted forward or, respectively, backward when the first counting stage has exceeded or fallen below predetermined counter readings, said second counting stage emitting the control signals.

The determination of the predetermined counter readings ensues in a particularly simple manner when the integration element contains a decoder which perceives the predetermined counter readings of the first counting stage and emits corresponding signals to the second counting stage.

The comparison of the momentary values of the demodulated data signals to the momentary values of the reference signals ensues in a particularly simple manner when an equivalence element is provided as the comparator.

DESCRIPTION OF THE PREFERRED EMBODIMENTS

Figure 1:
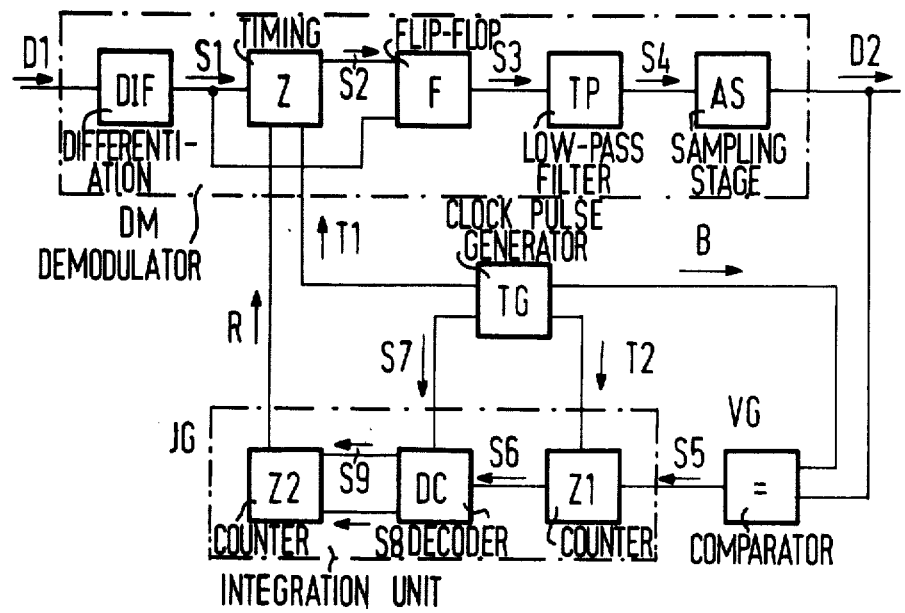
FIG. 1 is a block diagram of the circuit arrangement of the invention.

The circuit arrangement illustrated in FIG. 1 for the correction of step distortions contains a demodulator DM, a comparator VG, an integration unit JG and a clock pulse generator TG. Frequency-modulated data signals D1 are supplied to the demodulator DM. Given a transmission of binarily coded data, a characteristic frequency is allocated to each binary value of the data transmitted. Given a change of the binary value to be transmitted, the repetition rate of the data signals D1 changes continuously between these two characteristic frequencies.

The demodulator DM, for example, is designed similar to a demodulator described in German AS No. 2,606,515, incorporated herein by reference. The functioning of the demodulator DM is described hereafter together with the time diagrams illustrated in FIGS. 2 and 3.

Figure 2:
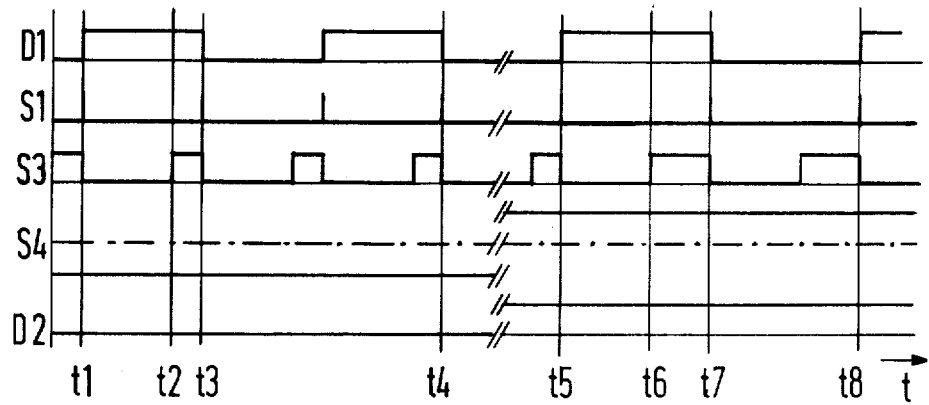
FIG. 2 illustrates signals at various points of a demodulator.

In the time diagrams illustrated in FIG. 2, the time t is illustrated in the abscissa direction and the momentary values of signals at various points of the demodulator DM are illustrated in the ordinate direction.

Between the points in time t1 and t4, it is assumed that the repetition rate of the data signals D1 is identical to the upper characteristic frequency which is allocated to a binary value 0, whereas it is assumed between points in time t5 and t8 that the repetition rate of the data signals D1 is identical to the lower characteristic frequency allocated to the binary value 1. The data signals D1 are supplied to a differentiation element DIF which generates a pulse S1 at each edge or each corresponding 0 passage of the data signals D1. The pulses S1 on the one hand trigger a measuring time duration in a timing element Z and, on the other hand, set a flip-flop F back. Thus, for example, at point in time t1, when the data signal D1 changes its binary value from 0 to 1, a pulse S1 is generated which triggers the measuring time duration and resets the flip-flop F. With the resetting of flip-flop F, the signal S3 at its output assumes the binary value 0. At time t2, the measuring time duration has elapsed and the timing element Z emits a signal S2 which sets the flip-flop F. The signal S3 thus assumes the binary value 1. At time t3, the data signal D1 changes its binary value from 1 to 0 and a pulse S1 is again generated which resets the flip-flop F so that the signal S3 again assumes the binary value 0.

The timing element Z, for example, is designed as a monostable flip-flop or as a counter which is reset to an initial value at each pulse S1, said counter being counted forward by means of clock pulses T1 generated in a clock pulse generator TG and generating the signal S2 upon reaching a predetermined counter reading. This signal S2, for example, is a transmission signal emitted by counters which can be readily purchased in the market place. The initial counter reading, the final counter reading, and the repetition rate of the clock pulses T1 determine the measuring time duration, and it is fixed in such manner that it is smaller than the time duration between the edges of the data signals D1 or is smaller than the period duration of the data signals D1. The pulse duration of signals S3 is, in every case, proportional to the difference proceeding from the time duration from the edges of the data signals D1 and the measuring time duration. Operations which correspond to those between times t1 and t3 are repeated between times t5 and t7. Since the repetition rate of the data signals D1 is smaller and the same measuring time duration occurs between times t5 and t6 as between times t1 and t2, the pulse duration of signals S3 between time t6 and t7 is greater than between times t2 and t3. The pulse durations of signals S3 are thus a measure for the repetition rate of the data signals D1.

The signals S3 are supplied to a low pass filter TP which emits signals S4 at its output, said signals corresponding to the integrated signals S3. The signals S4 are supplied to a sampling stage AS which emits binary demodulated data signals D1 at its output as a function of the signals S4. When the repetition rate of the data signals D1 is identical to the upper characteristic frequency and, thus, the signals S3 exhibit a narrow pulse duration, as is the case between time t1 and t4, the momentary value of signals S4 lies below a predetermined threshold illustrated with dot-dash lines. The sampling stage AS then emits a data signal D2 with the binary value 0. When, as between time t5 and t8, the repetition rate of the data signals D1 is identical to the lower characteristic frequency and the pulse duration of the signals S3 is thus greater, the momentary value of signals S4 lies above the threshold value and the sampling stage AS then emits a data signal D2 with the binary value 1.

Figure 3:
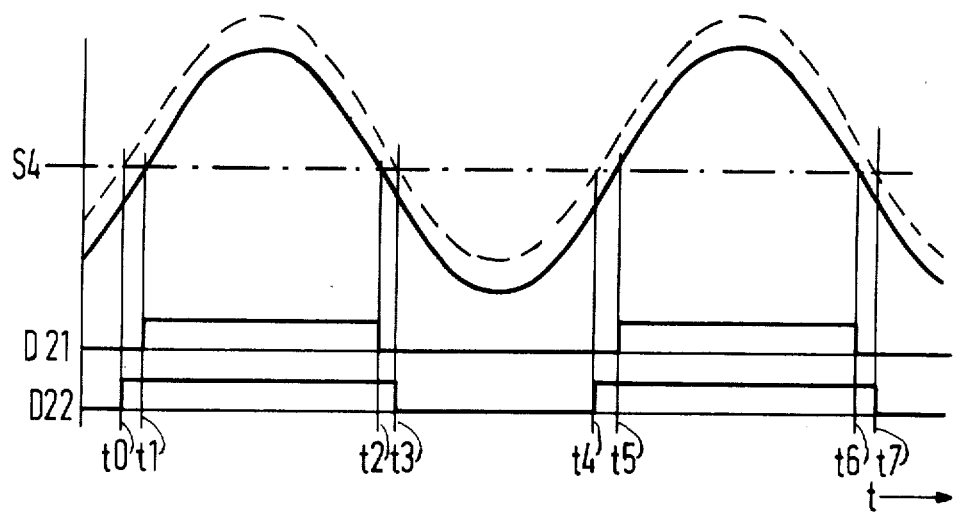
FIG. 3 illustrates undistorted demodulated data signals and demodulated data signals provided with step distortions.

In the time diagrams illustrated in FIG. 3, the time t is illustrated in the abscissa direction and the signals S4 and the data signals D2 are illustrated in the ordinate direction for the case in which the frequency-modulated data signals D1 exhibit no frequency deviation and a predetermined frequency deviation.

In case the data signals D1 exhibit no frequency deviation and the binary values 1 and 0 are alternately transmitted, the signal S4 exceeds the threshold indicated with dot-dash lines at the equi-distant times t1, t2, t5 and t6, and the demodulated data signal D21 respectively changes its binary value at these points in time.

In case the data signals D1 exhibit a frequency deviation toward lower frequencies, the pulse durations of the signals S3 are greater and the signals S4 thus have greater momentary values. The threshold in the sampling stage is thus exceeded or fallen below at times t0, t3, t4 and t7. Thus, the time duration between the edges of the data signals D22 are no longer of identical size, so that step distortions occur.

The correction of these step distortions is now described below in conjunction with the time diagrams illustrated in FIG. 4.

Figure 4:
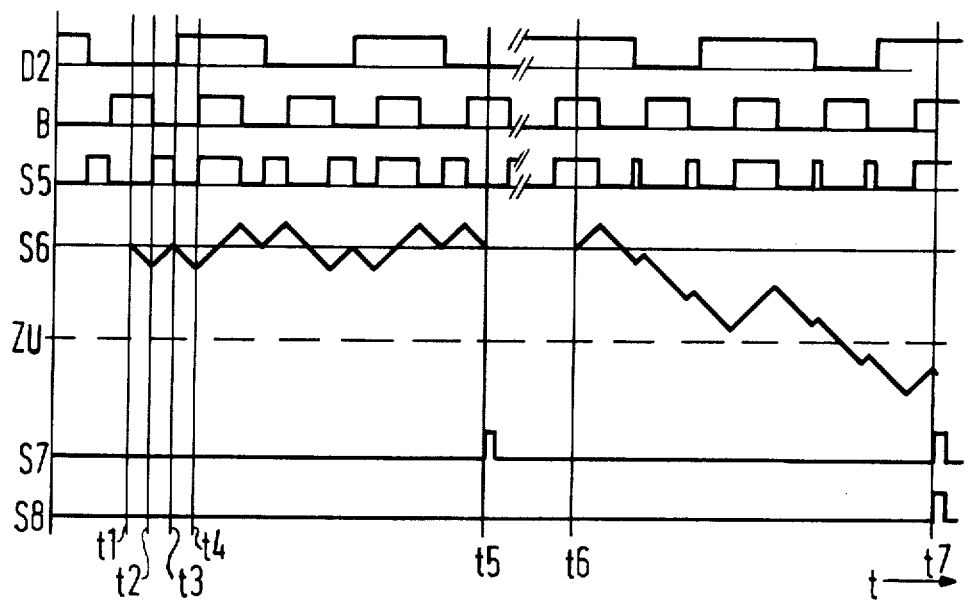
FIG. 4 illustrates further signals at various points in the circuit arrangement.

In the time diagrams illustrated in FIG. 4, the time t is illustrated in the abscisssa direction and the momentary values of signals at various points of the circuit arrangement are illustrated in the ordinate direction. For reasons of clarity, the counter readings of a first counting stage Z1 are presented in analog form as they would be emitted, for example, at the output of a digital-/analog converter connected thereafter to this counting stage.

It is assumed that the data signals D2 between times t1 and t5 exhibit no step distortion and exhibit step distortions between times t6 and t7. In both cases, the binary values 1 and 0 are alternately transmitted.

The clock pulse generator TG generates reference signals B whose repetition rate is equal to twice the step frequency of the data signals D2 and which are synchronized with the data signals D2 in such manner that the edges of the data signals D2 respectively fall in the center between two edges of the reference signals B. The data signals D2 and the reference signals B are supplied to a comparator VG which, for example, is designed as an equivalence element. The comparator VG generates signals S5 which always assume the binary value 1 or, respectively, 0 when the data signals D2 and the reference signals B exhibit identical or, respectively, different binary values. The signals S5 are supplied to the integration element JG.

The integration element JG integrates the signals S5 and emits control signals R to the timing element Z which, in the case of a step distortion, changes the measuring time duration in such manner that the step distortion is opposed.

The integration element JG contains a first counter stage Z1 which is respectively counted forward by means of clock pulses T2 during two period durations of the data signals D2. The counting stage is respectively counted forward or, respectively, backward when the signal S5 has the binary value 1 or, respectively, 0. A decoder DC examines the counter readings of counter stage Z1 represented by means of signals S6 in order to determine whether they exceed predetermined upper counter readings or fall below lower counter readings.

Between times t1 and t2 and between times t3 and t4, the data signals D2 and the reference signals B have differing binary values and the signal S5 thus respectively has the binary value 0. Between times t2 and t3, the data signals D2 and the reference signals B have the same operational sign, so that the signal S5 has the binary value 1. Between times t1 and t2 and t3 and t4, the counter stage Z1 is thus counted back, whereas it is counted forward between the times t2 and t3. Between times t4 and t5, the counter stage Z1 is alternately counted forward and backward in a manner similar to the counting between times t1 and t4. At time t5, a signal S7 emitted by the clock pulse generator TG is interrogated to see whether the counter reading lies within or beyond the upper and the lower counter reading. Since it was assumed that no step distortion exists, the counter stage Z1 at time t5 has the counter reading 0 which lies within the predetermined counter readings. Thus, no signal is emitted at the output of decoder DC.

In a manner similar to that between time t1 and t5, between times t6 and t7 the counter stage Z1 is alternately counted forward and backward. Since, however, a step distortion was assumed between times t6 and t7, the counter stage Z1 will be more frequently counted backward than forward, so that a negative counter reading exists at time t7. This negative counter reading falls below a lower counter reading ZU. Upon occurrence of signal S7, the decoder DC emits a signal S8 to a second counter stage Z2 which is counted forward by one unit by means of the signal S8. In case the counter reading at the end of the counting is greater than the upper counter reading, a corresponding signal S9 is emitted which counts the counter stage Z2 forward by one unit.

When no step distortion is present, the counter reading of counter stage Z2 is identical to the initial counter reading of the counter in the timing element Z. The counter reading of the counting stage Z2 is represented by means of control signals R which are supplied to the parallel inputs of the counter in the timing element Z. When the counter reading of the counter stage Z2 is reduced by means of the signal S8, the initial counter reading of the counter in timing element Z is also reduced. Consequently, the measuring time duration is increased, since more clock pulses T1 are required until the counter with the timing element Z achieves the predetermined final counter reading. The pulse durations of signals S3 are thus shortened and the DC component as a result of the frequency deviation is thus reduced. This operation is repeated until the DC component caused by the frequency deviation has been completely leveled or stabilized.

In order not to have to change the measuring time duration given each step distortion, such as for a single time disruption, for example, it is expedient that the control signals R be tapped only from the more significant stages of the counter stage Z2. In this case, the counter stage Z2 must first be counted in one direction a number of times before the control signals R change.

The counter in the timing element Z and the counter stages Z1 and Z2 are designed as commercially available counters, whereby the counter stages Z1 and Z2 can be counted up in forward and backward direction. The low pass filter TP is preferably designed in a known manner as an active low pass filter and the sampling stage AS is preferably designed with an operational amplifier as a Schmitt trigger with low hysteresis.

The decoder DC previously described consists of two pairs of comparators which are series connected and which can be purchased under the designation SN7485 from Texas Instruments, Inc. The first inputs of each of the pairs are connected with the outputs of the counting stage Z1. At the second inputs of the first pair are binary values which represent the upper prescribed counter reading, for example t8 as binary number 01000. The signal S7 is at an input "higher" at the least significant location of the comparators. If the count of the counter Z1 exceeds the value t8 and the signal S7 is present, then at the most significant location the comparators emit the signal S9 at the output "higher". In a corresponding manner, at the second inputs of the second pair of comparators are binary values which represent the lower prescribed count of the counter, for example −8 as binary number 10111. The signal S7 is an input "lower". If the count of the counter Z1 falls below the value −8 and the signal S7 is present, then the signal S8 is emitted at an output "lower".

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A circuit arrangement for the correction of step distortions of given step frequency in a transmission of data by use of frequency-modulated data signals, comprising:
    demodulator means for comparing time durations between edges of the frequency-modulated data signals with a measuring time duration generated by a timing element in the demodulator means, said demodulator means generating filtered demodulated data signals which have step distortions as a result of frequency deviations of the frequency-modulated data signals;

comparator means for comparing momentary values of the demodulated data signals with momentary values of reference signals generated by a clock pulse generator whose repetition rate is equal to twice the step frequency of the demodulated data signals; and integration means for integrating an output signal fo said comparator means and emitting control signals to said demodulator means, said control signal being fed to the timing element to oppose said step distortions of the demodulated data signals by changing the measuring time duration of the timing element.

2. A circuit arrangement according to claim 1 wherein said timing element in the demodulator is formed of a counter connected to be counted forward by clock pulses of constant repetition rate and whose counting range determines the measuring time duration, and the control signals emitted by the integration means being supplied to said counter in the timing element for changing its counting range.

3. A circuit arrangement according to claim 2 wherein the control signals change an initial counter reading of said counter in the timing element.

4. A circuit arrangement according to claim 1 wherein the integration means contains a first counter stage means which is counted forward or backward as a function of said output signal of the comparator means during fixed time durations, and a second counter stage means which is counted forward or, respectively backward when the first counter stage means has exceeded or fallen below predetermined counter readings, and which second counter stage means emits said control signals.

5. A circuit arrangement according to claim 4 wherein the integration means contains a decoder means for recognizing said predetermined counter readings of the first counter stage means and emitting corresponding signals to the second counter stage means.

6. A circuit arrangement according to claim 1 wherein an equivalence element is provided as the comparator means.

* * * * *